(12) United States Patent
Ishiguro et al.

(10) Patent No.: US 6,335,805 B1
(45) Date of Patent: Jan. 1, 2002

(54) IMAGE READING APPARATUS AND METHOD UTILIZING A PLURALITY OF LINE SENSORS

(75) Inventors: Kazuhiro Ishiguro, Toyohashi; Makoto Kumagai, Toyokawa, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/991,551

(22) Filed: Dec. 16, 1997

(30) Foreign Application Priority Data

Dec. 17, 1996 (JP) .............................................. 8-336674

(51) Int. Cl.[7] ................................................. H04N 1/04
(52) U.S. Cl. ........................................ 358/474; 358/468
(58) Field of Search ................................. 358/474, 475, 358/505, 514, 515, 483, 482, 468

(56) References Cited

U.S. PATENT DOCUMENTS

| 4,549,223 A | * | 10/1985 | Ozawa | 358/294 |
|---|---|---|---|---|
| 4,953,014 A | * | 8/1990 | Takaragi | 358/451 |
| 4,999,717 A | * | 3/1991 | Nagashima | 358/474 |
| 5,233,367 A | | 8/1993 | Curry | |
| 5,365,352 A | | 11/1994 | Tajima | |
| 5,430,550 A | * | 7/1995 | Hashimoto et al. | 358/497 |
| 5,550,651 A | | 8/1996 | Terajima | |
| 5,570,206 A | * | 10/1996 | Yoshinaga | 358/497 |
| 5,717,790 A | * | 2/1998 | Kanesaka et al. | 358/475 |
| 5,726,780 A | * | 3/1998 | Hirota et al. | 358/520 |
| 5,734,759 A | * | 3/1998 | Hirota et al. | 358/515 |
| 5,880,859 A | * | 3/1999 | Hiromatsu | 358/514 |

FOREIGN PATENT DOCUMENTS

| JP | 5-284283 | 10/1993 |
|---|---|---|
| JP | 7-221922 | 8/1995 |
| JP | 8-214152 | 8/1996 |

* cited by examiner

*Primary Examiner*—Jerome Grant, II
(74) *Attorney, Agent, or Firm*—McDermott, Will & Emery

(57) ABSTRACT

In an image reading apparatus, three line sensors simultaneously read images in different positions of a document and output respective image signals. Line memories receive the image signals and output them with a timing corresponding to the positions in which the images represented by the image signals have been read. Analog signal processing for the image signals is executed in a parallel manner to thereby allow a high-speed image read operation to be achieved with a low-speed analog processing circuit.

20 Claims, 16 Drawing Sheets

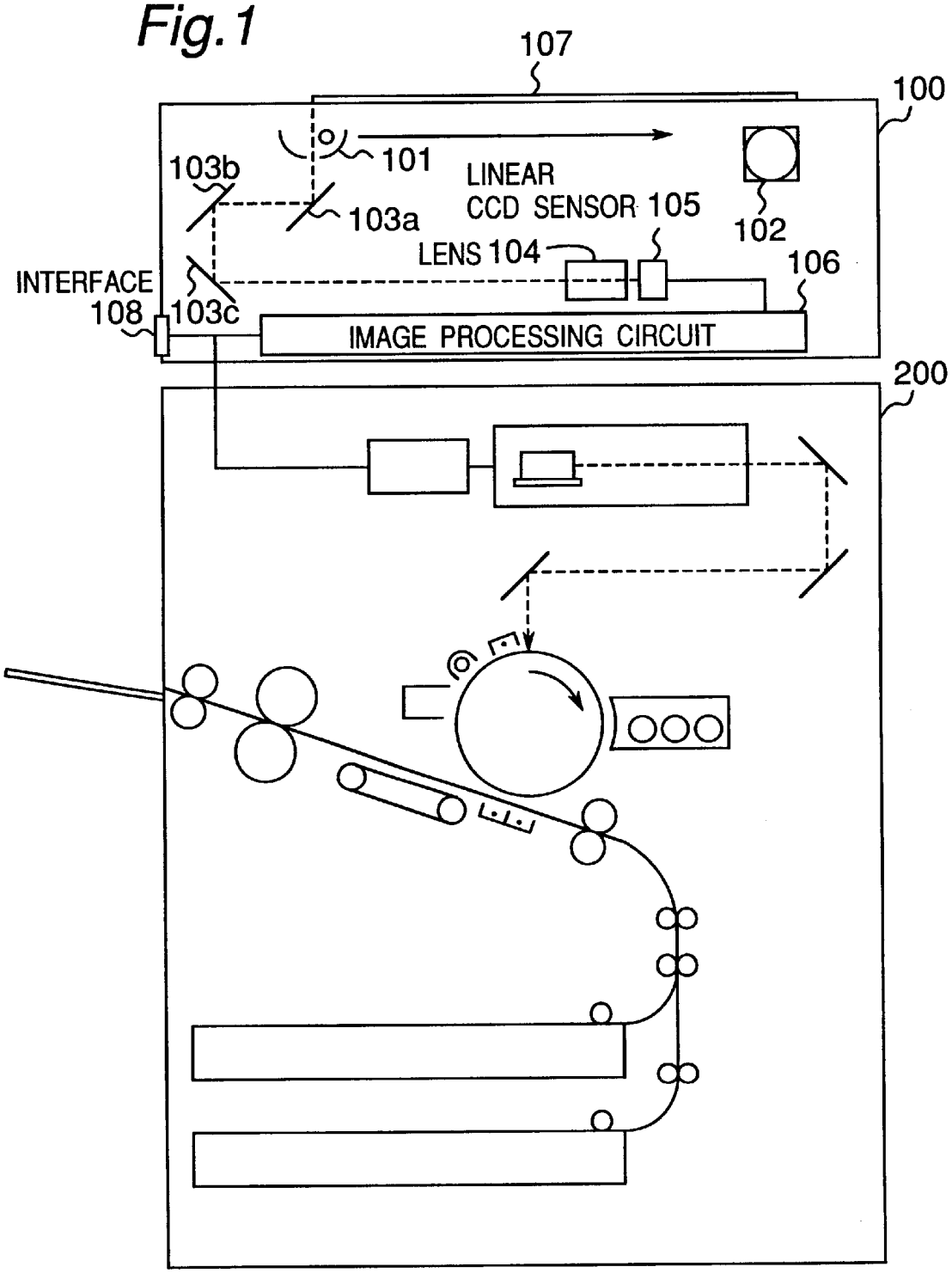

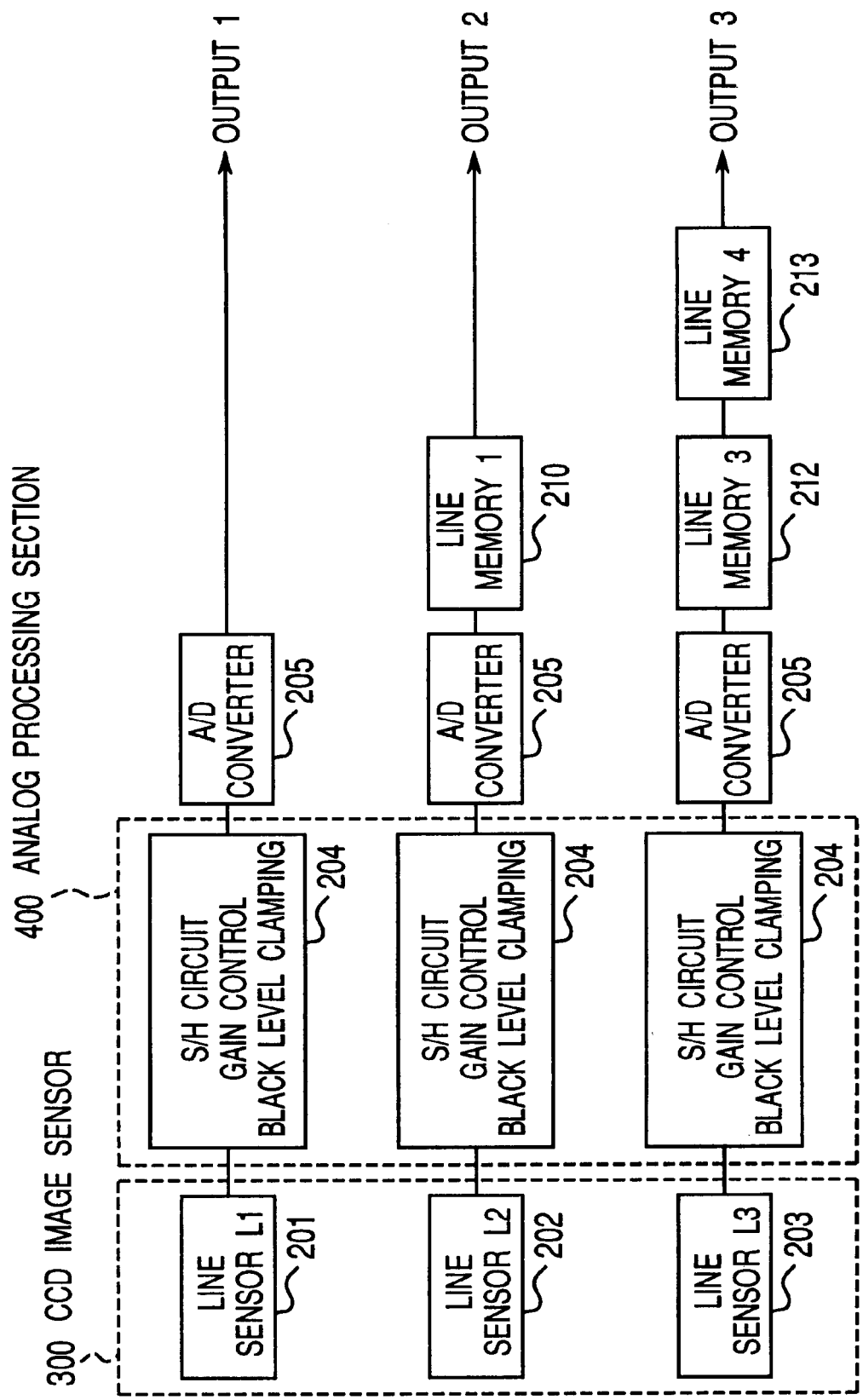

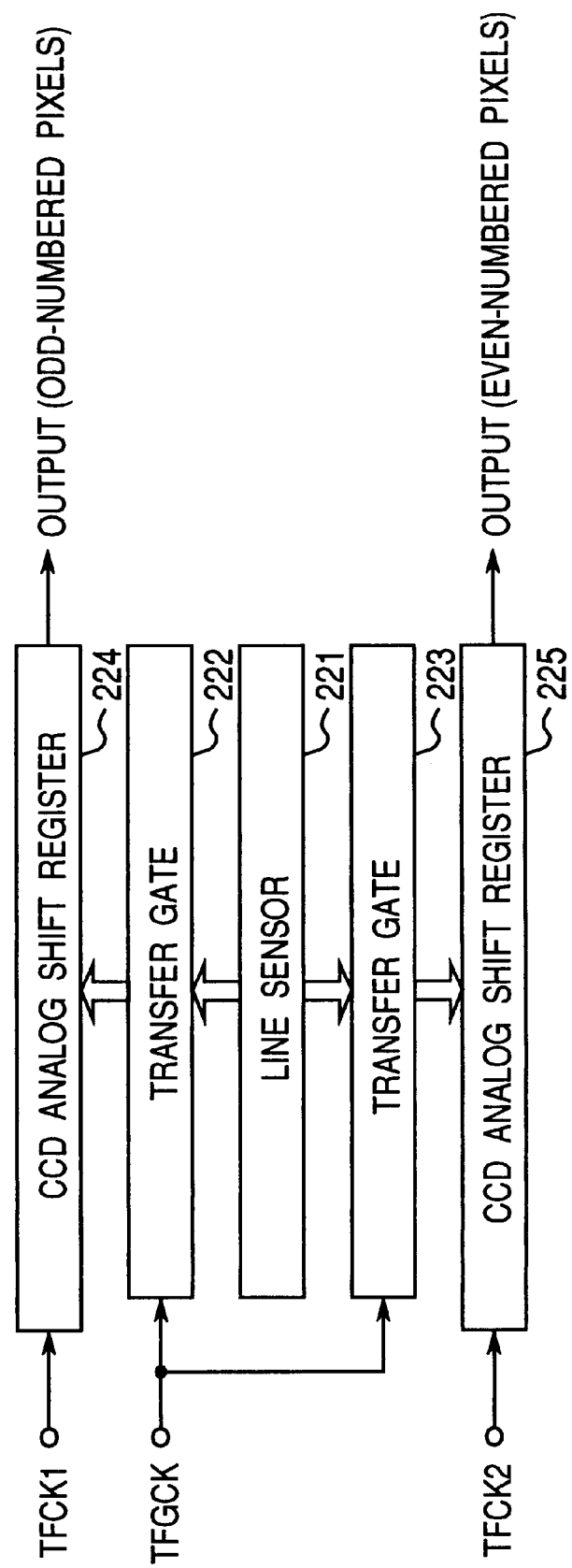

IMAGE READING APPARATUS AND METHOD UTILIZING A PLURALITY OF LINE SENSORS

This application is based on application No. 8-336674 filed in Japan, the contents of which is hereby incorporated by reference.

BACKGROUND OF THE INVENTION

The present invention relates to an image reading apparatus and method employing a linear CCD (Charge Coupled Device) sensor.

Conventionally, in the field of the image reading, there has been proposed a technique of improving the S/N (Signal-to-Noise) ratio of a read signal by summing outputs from a plurality of CCDs, as disclosed, for example, in the Japanese Patent Laid-Open Publication No. HEI 5-284283.

However, the aforementioned Japanese publication refers only to measures for improving the signal-to-noise ratio of the read signal and describes nothing about measures for increasing the operating speed.

SUMMARY OF THE INVENTION

A main object of the present invention is therefore to provide an image reading method capable of achieving a high-speed reading operation without increasing the operating speed of an analog processing circuit provided posterior to the CCD, and also to provide an image reading apparatus for carrying out such a method.

In an image reading method according to an aspect of the present invention, images in different positions of a document are simultaneously read by means of a plurality of line sensors to obtain respective image data while the document is being scanned. The respective image data are output in controlled sequence corresponding to the positions in which the images represented by the respective image data have been read. The images of the document are thereby reproduced.

This image reading method is implemented by an image read apparatus which includes:

a plurality of line sensors for simultaneously reading images in different positions of a document and outputting respective image data;

scanning means for making the plurality of line sensors scan the document; and document reproduction means for receiving the image data from the plurality of line sensors and outputting the respective image data in controlled sequence corresponding to the positions in which the images represented by the respective image data have been read, to thereby reproduce the images of the document.

In an image reading method according to another aspect of the present invention, a first mode and a second mode are selectively set when performing image reading with a same resolution. The first mode is a high image quality mode which provides an image quality better than that in the second mode. The second mode is a high-speed reading mode which provides a reading speed higher than that in the first mode. Then, a document is scanned based on the reading mode selectively set, and images in different positions of a document are simultaneously read to obtain respective image data during the scanning.

This method is implemented by an image reading apparatus which includes:

a plurality of line sensors for simultaneously reading images in different positions of a document and outputting respective image data;

scanning means for making the plurality of line sensors scan the document;

reading mode setting means for, when performing image reading with a same resolution, selectively setting a first mode and a second mode, wherein the first mode is a high image quality mode which provides an image quality better than that in the second mode, and the second mode is a high-speed reading mode which provides a reading speed higher than that in the first mode; and control means for controlling the scanning means based on the reading mode set by the reading mode setting means.

In an image reading method according to a further aspect of the present invention, an energy saving mode is set to read a document at a lower energy. Then, the document is scanned, and images in different positions of the document are simultaneously read to obtain respective image data during the scanning of the document. The thus obtained image data are subjected to a predetermined operation before being output for reproduction of the images of the document.

This method is carried out by an image reading apparatus which includes:

a plurality of line sensors for simultaneously reading images in different positions of a document and outputting respective image data;

scanning means for making the plurality of line sensors scan the document;

reading mode setting means for setting an energy saving mode to read the document at a lower energy; and operation means for, when the energy saving mode has been set, performing a predetermined operation to the image data output from the plurality of line sensors.

The present invention further provides an image reading apparatus which includes image reading means, photographic mode setting means, discriminating means, reading mode setting means, and control means. The image reading means scan a document to output image data. The photographic mode setting means set a photographic mode in accordance with a type of the document. The discriminating means discriminate whether the photographic mode has been set or not. The reading mode setting means selectively set a normal image quality reading mode and a high image quality reading mode based on discrimination results. The normal image quality reading mode is set when the photographic mode has not been set, and the high image quality reading mode is set when the photographic mode has been set. The control means control the image reading means based on the reading mode set by the reading mode setting means.

Further, the present invention provides an image reading apparatus including a plurality of line sensors, scanning means, reading mode setting means, control means, and document reproduction means. The line sensors simultaneously read images in different positions of a document and outputting respective image data. The scanning means make the plurality of line sensors scan the document. The reading mode setting means set a high-speed reading mode. When the high-speed reading mode has been set, the control means control the scanning means to allow the plurality of line sensors to scan the document in a manner such that each of different parts of the document is read only once. The document reproduction means receive the image data from the plurality of line sensors and output the respective image data in controlled sequence corresponding to the positions in which the images represented by the respective image data have been read. Thereby, the images of the document are reproduced.

Other objects, features, and advantages of the present invention will be apparent from the accompanying drawings and from the detailed description that follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram showing the construction of a digital copying machine including an embodiment of the image reading apparatus of the present invention;

FIG. 2 is a block diagram showing the construction or a signal processing circuit of a linear CCD sensor incorporated in the first embodiment of the present invention;

FIG. 3 is a block diagram of a linear CCD sensor having a single line sensor;

DETAILED DESCRIPTION OF THE PREFERRED EMBODIMENTS

Figure 2A:
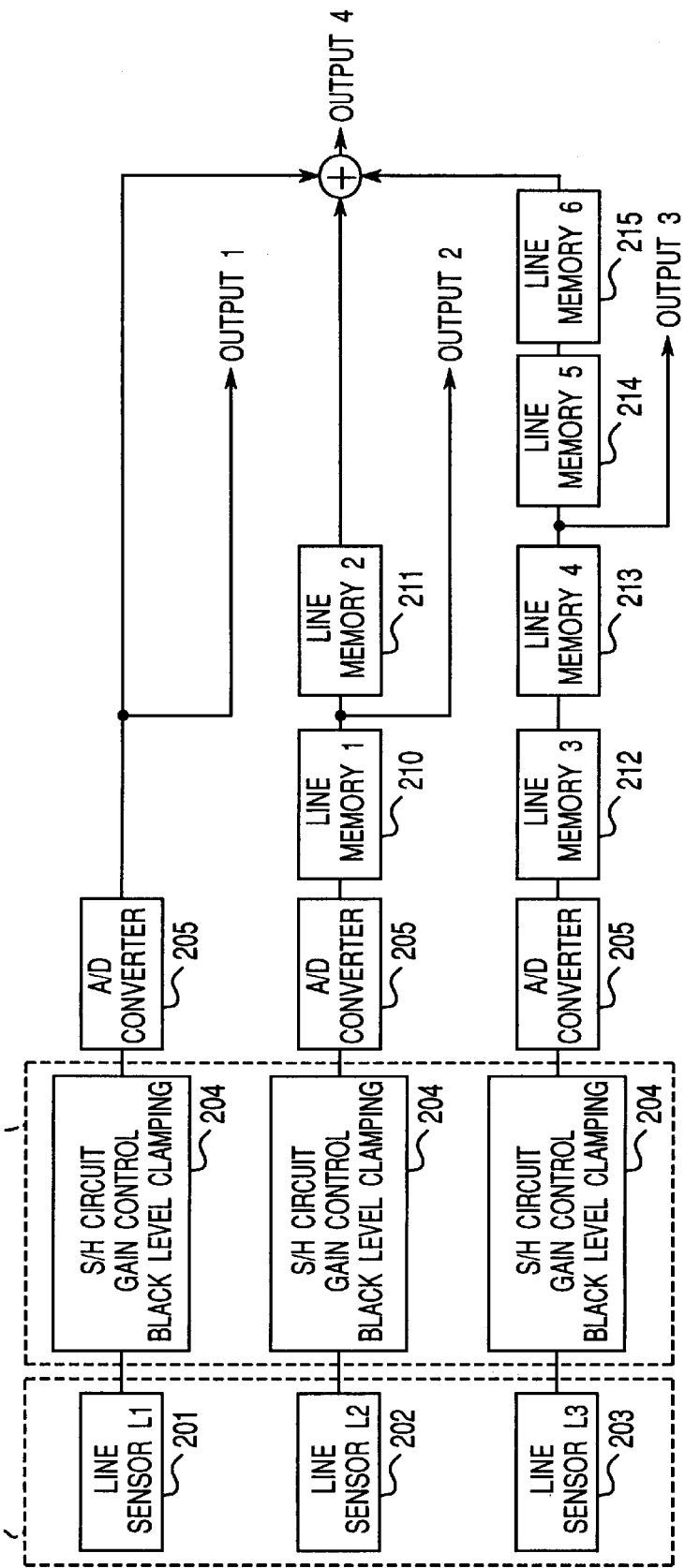
FIG. 2A is a block diagram showing the construction of a signal processing circuit of a linear CCD sensor incorporated in a second embodiment of the present invention.

The image reading apparatus of the present invention will be described in detail below with reference to embodiments shown in the accompanying drawings.

FIG. 1 shows an example of the construction of a digital copying machine. This digital copying machine is constructed essentially of an image reading section 100 which is an embodiment of the present invention and a printer section 200. This digital copying machine achieves a copying function normally by transmitting image data read by the image reading section 100 to the printer section 200 and forming an image from the image data in the printer section 200.

This digital copying machine is connectable with external equipment by way of an interface 108. Accordingly, data read by the image reading section 100 can be output to the external equipment via the interface 108. Conversely, image data can be transmitted from the external equipment to the printer section 200 via the interface 108 so that an image is formed in the printer section 200.

Note that, because the printer section 200 is out of the scope of the present invention, a detailed description thereof is omitted here.

The image reading section 100 has an exposure lamp 101, a document glass 107, mirrors 103*a*, 103*b* and 103*c*, a lens 104 and a linear CCD sensor 105. Light reflected on the document placed on the document glass 107 irradiated by the exposure lamp 101 is guided to the lens 104 by the three mirrors 103*a*, 103*b* and 103*c* and focused on the linear CCD sensor 105.

The exposure lamp 101 and the mirror 103*a* are actuated by a scanner motor 102 to move in the direction of arrow in FIG. 1 at a velocity v corresponding to a magnification ratio. Thus, the entire surface of the document placed on the document glass 107 is scanned. With the movement of the exposure lamp 101 and the mirror 103*a*, the mirrors 103*b* and 103*c* also move in the same direction at a velocity v/2.

The light which has been reflected on the document and incident on the linear CCD sensor 105 is converted into an electric signal in the linear CCD sensor 105, and the electric signal is subjected to analog processing, analog-to-digital conversion and digital image processing in an image processing circuit 106 and thereafter transmitted to the interface 108 or the printer section 200.

(First Embodiment)

FIG. 2 shows the construction of a first embodiment of the present invention. This first embodiment is provided with three line sensors L1, L2 and L3 denoted by reference numerals 201, 202 and 203, which are formed on an identical wafer. Output signals from these three line sensors L1 through L3, denoted by 201 through 203, are input to three respective analog processing circuits 204, in which the signals are subjected to analog signal processing such as S/H (Sample and Hold), gain control, black level clamping and so forth. Thereafter the signals are supplied to the respective A/D converters 205 for the conversion into digital signals.

Subsequently, assuming that one line intervenes between the line sensors L1–L3, 201–203, i.e., each line sensor L1–L3 corresponds to every other line and that the line sensor L1, 204, is for the head line with respect to the sub-scanning direction (i.e., the vertical scanning direction), then the line sensor L2, 202, is adjusted in its reading position by means of a delay memory (line memory 1, 210) for one line, and its signal is supplied to an output 2. Further, the line sensor L3, 203, is adjusted in its reading position by means of delay memories (line memory 3, 212, and line memory 4, 213) for two lines, and its signal is supplied to an output 3. As a result, the document read data of three lines are continuously output to the outputs 3, 2 and 1 in this order for reproduction of images of the document.

FIG. 3 shows a construction attendant on one line sensor 221 owned by the linear CCD sensor 105. Although not shown in the figure, this line sensor 221 is constructed of an array of photodiodes and electrodes for accumulating therein electric charges generated from the photodiodes. Every other output from this line sensor 221 starting from the first one (referred to as "odd-numbered output") and every other output from this line sensor 221 starting from the second one (referred to as "even-numbered output") are output to a transfer gate 222 and a transfer gate 223, respectively. The outputs are then transferred from the transfer gates 222 and 223 to the corresponding CCD analog shift registers 224 and 225. It is to be noted that the transfer gates 222 and 223 are controlled by a transfer gate clock TFGCK. The CCD analog shift registers 224 and 225 are controlled by a transfer clock TFCK 1 and a transfer clock TFCK 2, respectively. By simultaneously changing these transfer clocks TFCK 1 and TFCK 2 in opposite phases, data in the CCD analog shift registers 224 and 225 are output.

The aforementioned three line sensors L1 through L3 denoted by 201 through 203 have respective attendant constructions similar to that of the line sensor 221.

Figure 8:
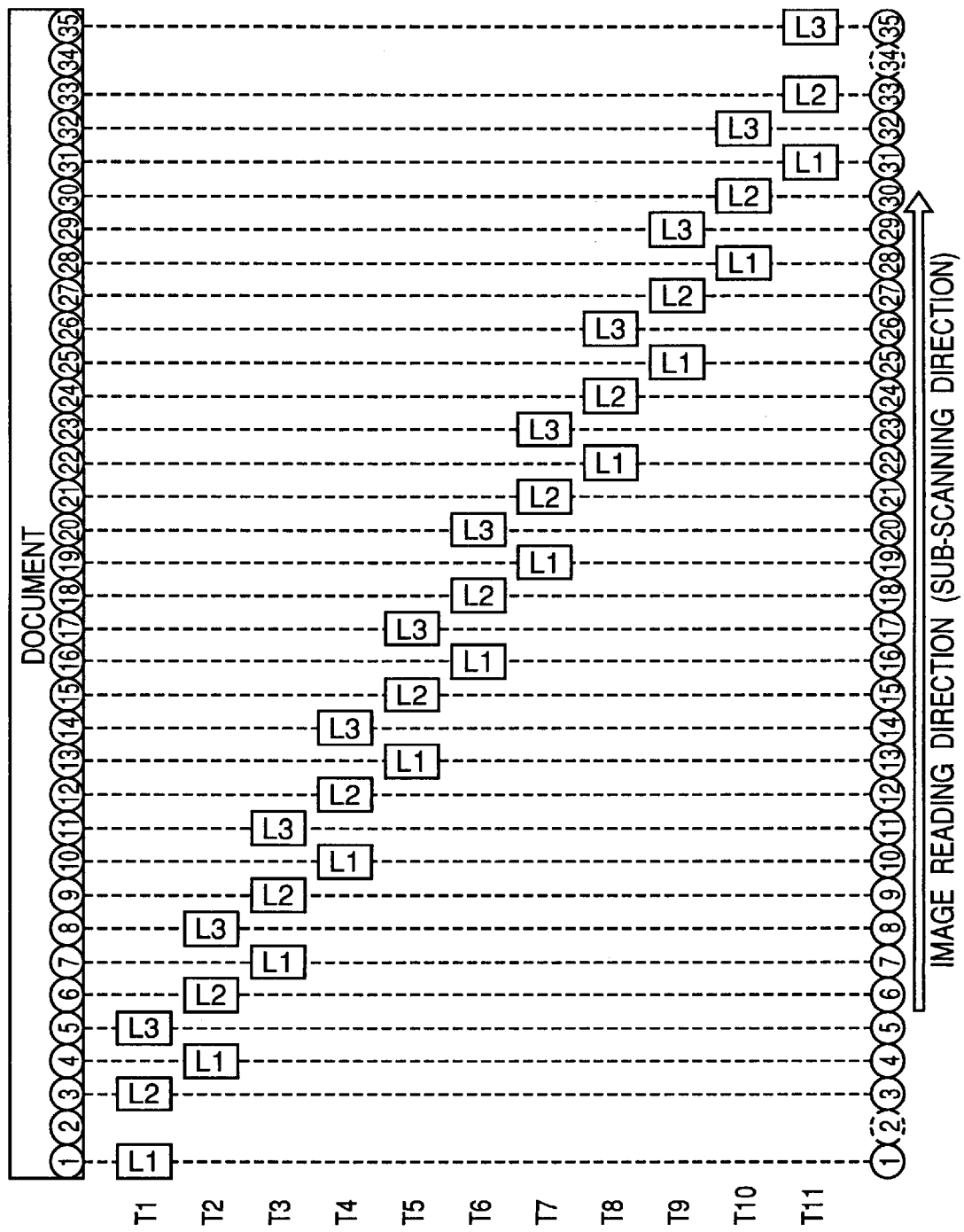
FIG. 8 is an explanatory view showing document reading positions of a linear CCD sensor having three line sensors in the first embodiment.

Referring next to FIG. 8, there are shown document reading positions of the line sensors L1, L2 and L3 when reading is executed at a speed three times a reference speed by the linear CCD sensor 105 having the three line sensors L1 through L3, 201 through 203. Such reading positions are denoted by the circled numbers 1, 2, 3, 4, . . . , 33, 34, 35 in the figure, but these numbers will be indicated with parentheses hereinbelow. The reference speed mentioned herein is the scanning speed when the reading of the document is executed by a linear CCD sensor having a single line sensor. In the present case, one line intervenes between the line sensors of the linear CCD sensor. It is to be noted that the conventional reading method reads the document in the order of the numbers (1) to (35) on the document surface in the figure.

In FIG. 8, reference characters T1, T2, T3, . . . , T11 denote times arranged in accordance with a lapse of time, where each of the times T1, T2, . . . , T11 has a duration of a unit time T. FIG. 8 shows that the line sensors, with their line numbers provided in the square frames, are arranged to read images in the corresponding positions in which the symbols (1)–(35) representing the positions are connected with the numbered square frames by dashed lines.

FIG. 8 shows the reading positions when the linear CCD sensor 105 is made to scan at a speed three times the normal speed. The line sensor L1 reads an image located in the position (1) on the document surface at the time T1. At the time T2, the line sensor L1 reads an image located in the position (4) on the document surface.

Therefore, if the reading is continued with only the line sensor L1, the resolution of the read image becomes one third of that in the case where the scanning is executed at the reference speed. However, since three line sensors L1, L2 and L3 are employed in this embodiment, an image which is located in the position (5) on the document surface and is not read by the line sensor L1 at the time T2 and time T3 is read by the line sensor L3 at the time T1, and an image located in the position (6) on the document surface is read by the line sensor L2 at the time T2.

In this case, as shown in FIG. 2, the timing between the line sensors is adjusted by outputting a signal of the line sensor L3 from the output 3 with a delay of two lines effected by the line memories 3 and 4 and outputting a signal of the line sensor L2 from the output 2 with a delay of one line effected by the line memory 1.

It is to be noted that the dummy reading of two lines is required because a deficiency occurs in the read data in the reading starting stage and reading ending stage.

Due to the characteristics of the linear CCD sensor 105, it accumulates electric charges while it is receiving the reflection light of the exposure lamp 101. Therefore, when the scanning speed is made three times the normal speed, as described above, the line sensors L1, L2 and L3 disadvantageously accumulate electric charges for three lines if each drive clock is input in accordance with the same timing as that for the normal scanning. Therefore, the resolution of the read image data consequently becomes one third of that in the normal scanning. In other words, when the input timing of the clock is the same as that in the normal scanning, the line sensor L1 reads images in the positions (2) and (3) in addition to the image in the position (1) during a period T of the time T1, and consequently the resolution is disadvantageously reduced to one third.

This problem can be solved by providing a liquid. crystal electronic shutter at the light receiving section, of the linear CCD sensor 105 so as not to read the data of unnecessary portions. For example, it is proper to operate the liquid crystal electronic shutter in a manner such that the line sensor L1 reads only the image of the position number (1) and does not read the images of the position numbers (2) and (3) during the period T of time T1 shown in FIG. 8. When the electronic shutter is thus used, it is not necessary to increase the rate of providing the transfer clock nor to read out the image signal at a high speed.

Instead of using the electronic shutter, it is also acceptable to use a linear CCD sensor having a shutter function provided by an accumulated electric charge drain as the linear CCD sensor 105. In this case, what is required is to secure a short time for operating the drain once in the time T. In this case also, there is no need for increasing the rate of generating the transfer clock. This arrangement allows signal processing to be achieved not with a high-speed analog processing circuit but with a normal analog processing circuit.

Figure 9:
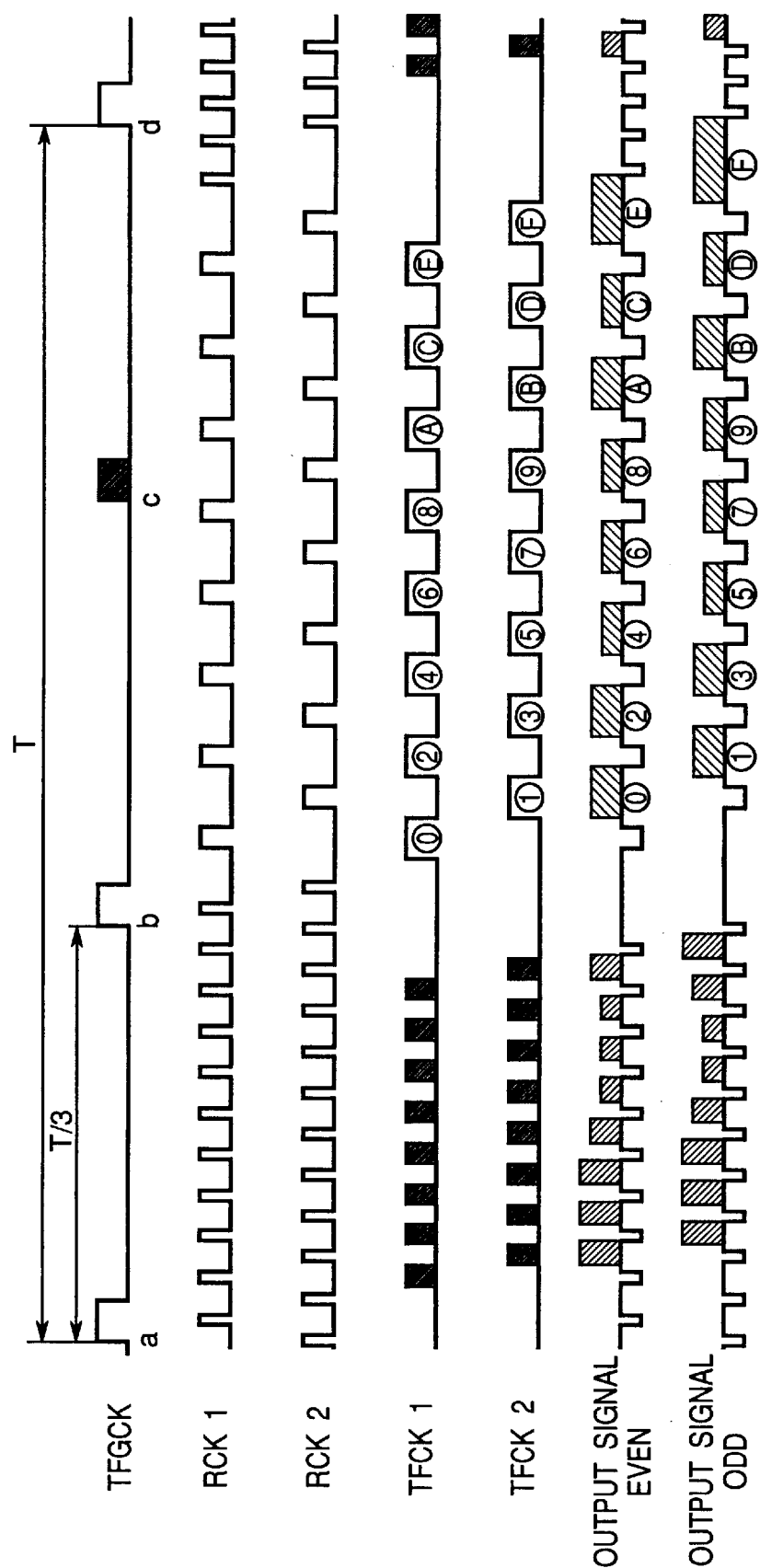
FIG. 9 is a timing chart showing CCD drive clocks in the high-speed reading process of the first embodiment.

Further, as another means for avoiding the reading of the unnecessary images, drive clock control means may be adopted. The contents of the drive clock control will be described with reference to FIG. 9. FIG. 9 is a timing chart showing drive clocks for the linear CCD sensor 105. In this case, the linear CCD sensor 105 has sixteen pixels per line. In FIG. 9, T denotes a read time per line at the reference speed.

Electric charges accumulated in the line sensor L1 (or L2 or L3) are transferred to the analog shift registers 224 and 225 while the transfer gate clock TFGCK is turned on. The transferred electric charges are output as an output signal ODD and an output signal EVEN when the transfer clocks TFCK1 and TFCK2 are supplied to the analog shift registers 224 and 225. In FIG. 9, RCK1 and RCK2, represent reset clocks.

In this embodiment, the scanning is executed at a speed three times the reference speed, and the three line sensors L1, L2 and L3 are used. These line sensors L1, L2 and L3 each output data of one line during the time T. It is to be noted that because the scanning speed is three times the reference speed, the read time of one line should be T/3 for the purpose of maintaining the resolution obtained in the reading stage at the reference speed.

The electric charges accumulated in the line sensor L1 during the read time (T/3) of one line, for example, during the period from a time "a" to a time "b" in FIG. 9 are transferred to the analog shift registers 224 and 225 in response to the transfer gate clock TFGCK at a time "c" subsequent to the time "b". Further, the transferred electric charges are output in response to the transfer clocks TFCK1 and TFCK2. As a result, the output signals each have the same resolution as that obtained in the reading at the reference speed.

Furthermore, according to this embodiment, the image signal processing can be done during the period of (⅔)·T (i.e., the period from the time "b" to a time "d"), the high-speed analog signal processing is not required. If the reading is executed at the speed three times the reference speed by means of a linear CCD sensor having at single line sensor, the output rate of the image signals is tripled proportionally. Therefore, the high-speed analog signal processing is necessary.

Since the reading is executed by the other two line sensors L2 and L3 in the period between the time "b" and the time "d", the electric charges accumulated in the line sensor L1 in the period between the time "b" and the time "d" is not necessary. Therefore, the electric charges accumulated in the line sensor L1 are discharged in response to the transfer gate clock TFGCK at the time "d" before the line sensor L1 yields an output of the next line.

In the above embodiment, the linear CCD sensor 105 having three line sensors, with one line intervening between the sensors, is adopted, and the scanning speed is made three times the reference speed. As easily understood from this, it is acceptable to provide n line sensors and make the scanning speed n times the reference speed. If "n" is four or larger, the reading operation can be achieved at a higher speed.

(Second Embodiment)

A second embodiment of the present invention will be described next.

Figure 11:
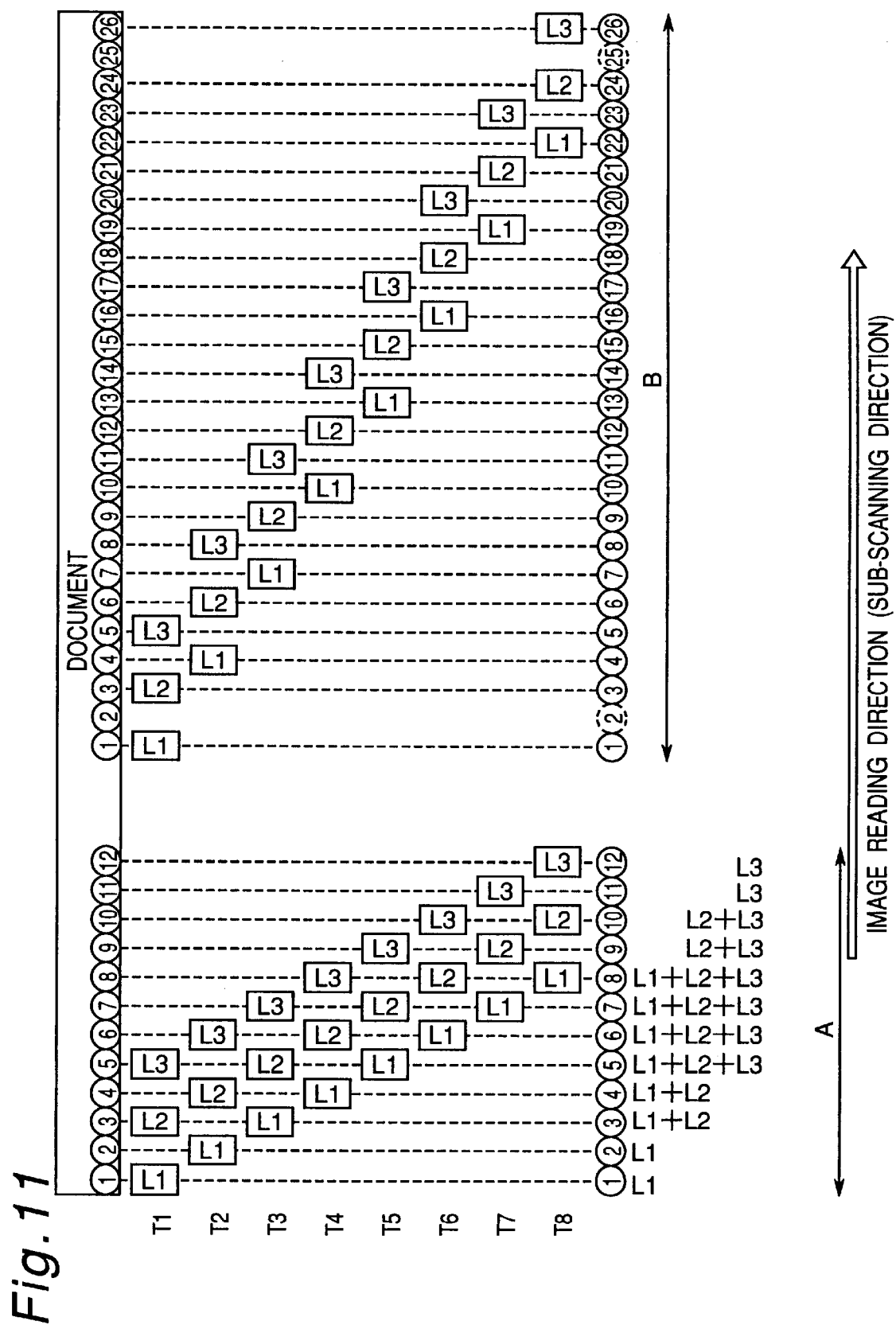
FIG. 11 is an explanatory view showing document reading positions on a document when the reading is performed at a reference speed and a speed three times the reference speed in the second embodiment.

FIG. 11 shows document reading positions at the times T1, T2, T3, . . . in the case where a linear CCD sensor having three line sensors L1, L2 and L3 execute reading at the reference speed within an area indicated by a double-headed arrow A. FIG. 11 also shows document reading positions at the times T1, T2, T3, in the case where the linear CCD sensor having three line sensors L1, L2 and L3 execute reading at a speed three times the reference speed within an area indicated by a double-headed arrow B.

Within the range of arrow A, the line sensors L1, L2 and L3 read an identical line on the document in the positions numbered (5) through (8) in the figure. Therefore, by summing the signals of the three line sensors L1, L2 and L3 which have read the identical line on the document, the signal-to-noise ratio of the read image is improved.

The circuit construction of this embodiment is shown in FIG. 2A. The circuit construction shown in FIG. 2A includes the entire circuit construction of the first embodiment shown in FIG. 2. In FIG. 2A, line memories 1 and 2, denoted by reference numerals 210 and 211, for two lines are connected between the line sensor L2 and an output 4, and line memories 3, 4, 5 and 6, denoted by reference numerals 212, 213, 214, and 215, for four lines, are connected between the line sensor L3 and the output 4. With this construction, the signals of the identical line on the document read by the three line sensors L1, L2 and L3 are obtained from the output 4 at the same time.

By thus using the signal obtained by adding the outputs from the line sensors L1, L2 and L3, the signal-to-noise ratio of the read image is improved.

It is preferable to provide an output changeover section which is able to select a desired output from among the output 1, output 2, output 3 and output 4 and is able to be connected to this desired output. In this case, for example, for a document which requires a high image quality, the reading may be performed at the reference speed by selecting the output 4 by the output changeover section and summing the read data as described above. The signal-to-noise ratio can thus be improved. For a document which does not require a high image quality, by selecting the outputs 1, 2 and 3 by the output changeover section, the high-speed image reading can be performed as described in connection with the first embodiment.

(Third Embodiment)

Next, a third embodiment of the present invention will be described next. The circuit of the third embodiment shown in FIG. 4 differs from the circuits of the first and second embodiments shown in FIGS. 2 and 2A only in the construction of portions posterior to the A/D converters 205. That is, in the third embodiment, outputs of the three A/D converters 205 are connected with an image memory 230, and this image memory 230 is connected with an output of an output changeover section 231.

The image memory 230 stores therein the read image data obtained by reading a document.

Figure 4:
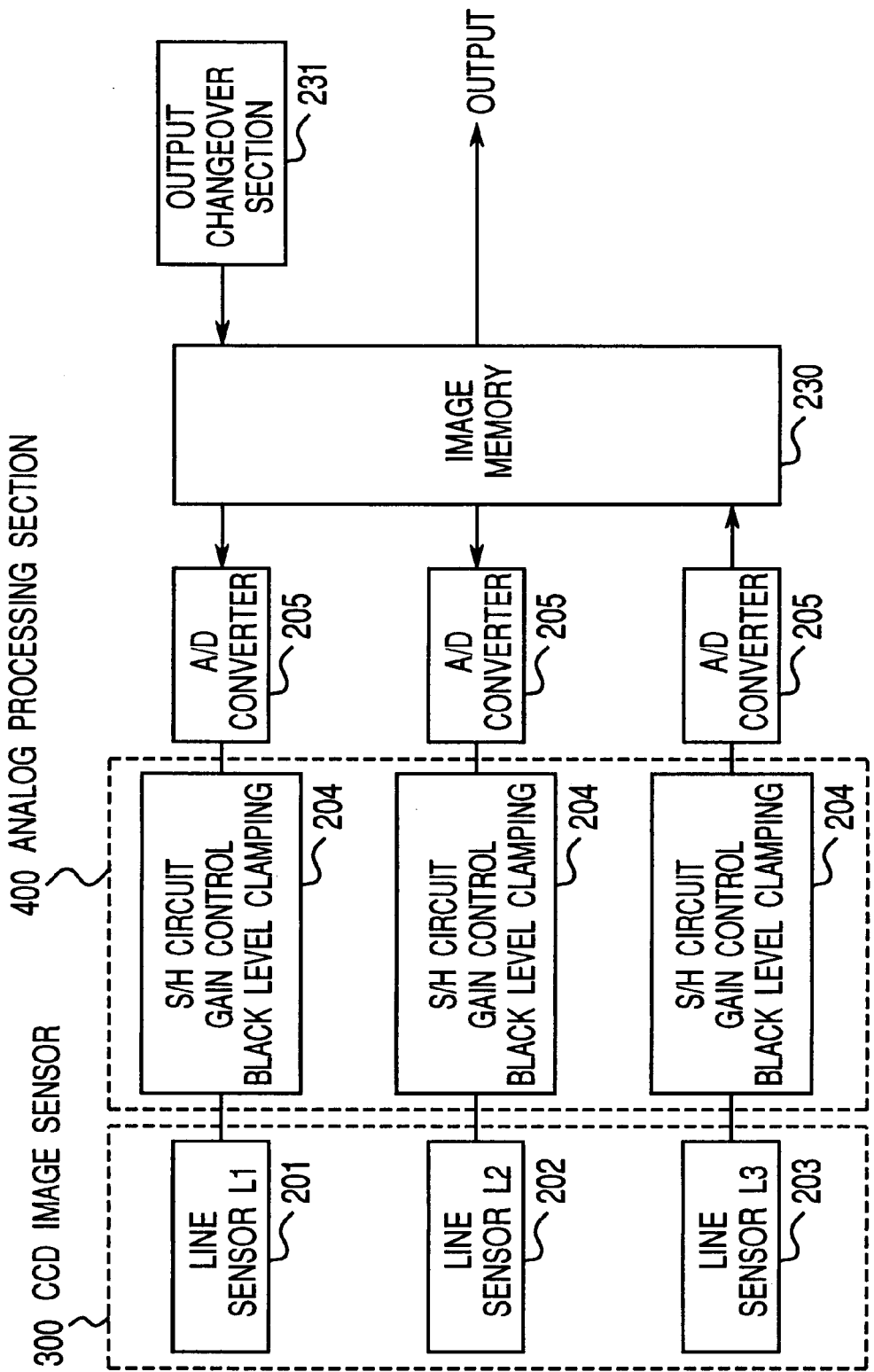
FIG. 4 is a block diagram showing the construction of a signal processing circuit of a linear CCD sensor employing an image memory according to a third embodiment of the present invention.

In FIG. 4, three line sensors L1 through L3 denoted by 201 through 203 are formed on an identical wafer. Output signals from the line sensors L1 through L13 denoted by 201 through 203 are subjected to analog signal processing such as S/H (Sample and Hold), gain control, black level clamping and so forth, and thereafter converted into digital signals by the respective A/D converters 205.

The digitized signals for each line are given respective addresses and sequentially stored in the image memory 230. Then, the thus stored image data are read out from the image memory 230 in sequence according to a document reading method of, for example, "reading at the reference speed" or "reading at the triple speed".

Figure 5:
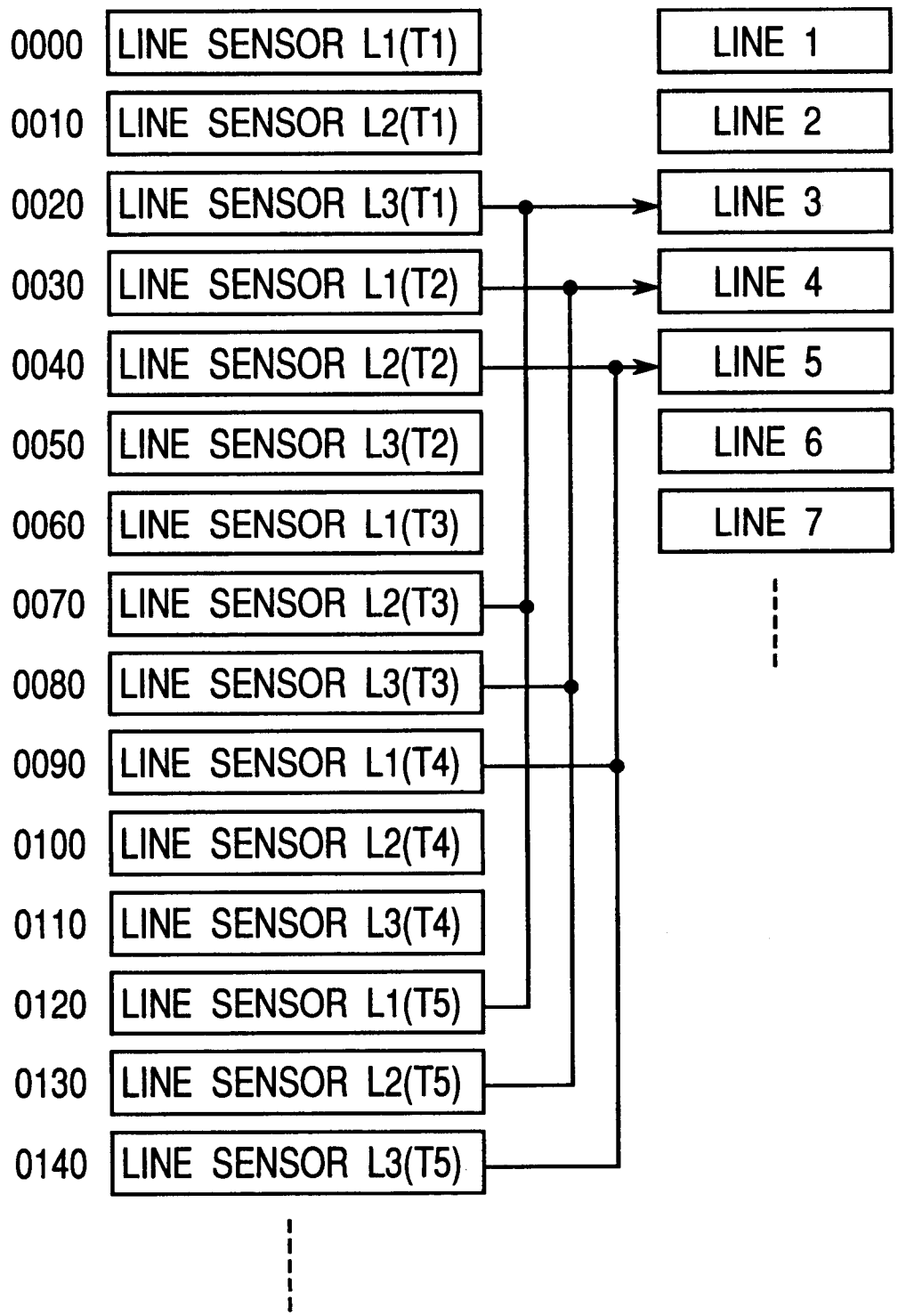
FIG. 5 is a block diagram showing an image data read sequence in a high image quality reading stage of the third embodiment.

FIG. 5 shows a read-out sequence of the image data when the reading is executed at the reference speed (high image quality reading). By handling the data from the line sensors L1, L2 and L3 as data of one line, the signal-to-noise ratio of the image data can be improved. For example, by handling a sum of data at an address 0020, data at an address 0070 and data at an address 0120 as the one line data, the signal-to-noise ratio of the image data is improved. It is to be noted that the image data read-out sequence is determined by the output changeover section 231.

Figure 6:
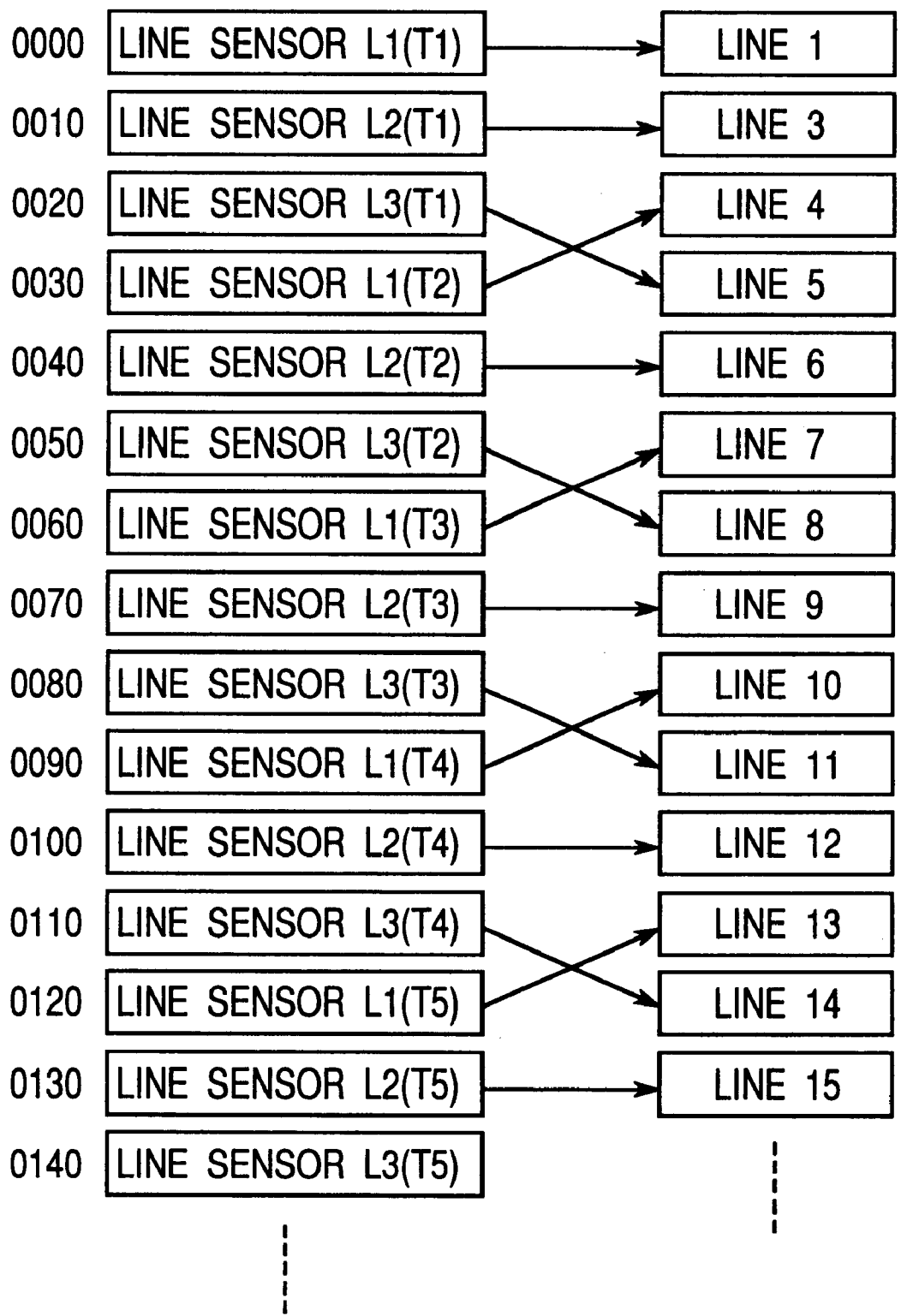
FIG. 6 is a block diagram showing an image data read sequence in a high-speed reading stage of the third embodiment.

FIG. 6 shows an image data read-out sequence when the reading is executed at the speed three times the reference speed. As shown in FIG. 6, by adjusting the read-out sequence of image data of the line sensors L1 , L2 and L3, high-speed reading can be achieved as in the first and second embodiments employing the line memories.

The addresses of the image data to be taken out can be obtained from FIG. 11. When performing the reading at the speed three times the reference speed in the range indicated by a double-headed arrow B in FIG. 11, image data that the line sensor L1 has read at the time T1 from the portion (1) of the document becomes data of the line 1. Image data that the line sensor L2 has obtained at the time T1 from the portion (3) of the document becomes data of the line 3. Image data that the line sensor L1 has obtained at the time T2 from the portion (4) of the document becomes data of the line 4.

Both the image memory 230 and the line memories may be employed together to save memory capacity to be used. In this case, the line memories may be used in a high image quality made (reading at the reference speed) in which, for example, a multi-value expression is desired. On the other hand, when attaching greater importance to the high-speed reading, the image may be handled in the form of, for example, binary data. Thus, the memory capacity can be saved.

(Fourth Embodiment)

A fourth embodiment of the present invention will be described next. This fourth embodiment is provided with a linear CCD sensor having six line sensors L1, L2, L3, L4, L5 and L6, denoted by 261, 262, 263, 264, 265 and 266, respectively, in FIGS. 7 and 10.

Figure 10:
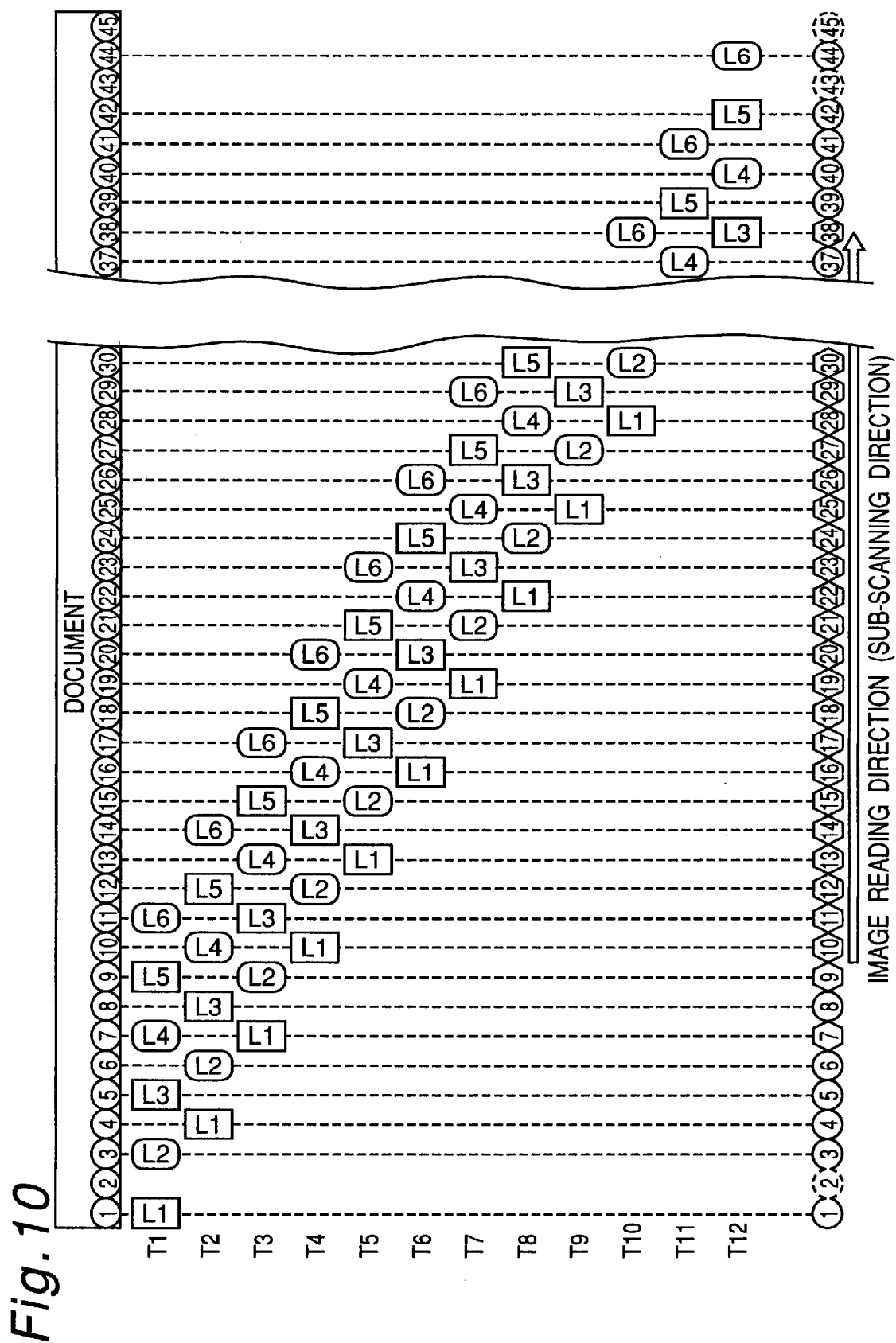
FIG. 10 is an explanatory view showing document reading positions of the linear CCD sensor having six line sensors in the fourth embodiment.

FIG. 10 shows document reading positions when the reading is executed by these six line sensors L1 through L6 denoted by 261 through 266 at a speed three times then reference speed.

The circled numbers 1 through 45 indicated on the document surface in FIG. 10 denote the document read sequence according to the conventional reading method. Those numbers will be indicated with parentheses hereinbelow. It is assumed here that one line intervenes between the adjacent line sensors L1 through L6 of the linear CCD sensor, i.e., the line sensors L1 through L6 correspond to the alternate lines.

T1, T2, T3, ..., T12 denote times in accordance with a lapse of time, where the times T1, T2, ..., T12 have a duration of a unit time T. FIG. 10 shows that the line sensors L1 through L6 read the images in the positions. denoted by the symbols (1) through (45) each of which is linked with the frame surrounding the corresponding line number L1–L6 by a dashed line.

In the time T1 in FIG. 10, the line sensor L1 reads an image located in the position (1) on the document surface. In the time T2, the line sensor L1 reads an image located in the position (4) on the document surface. When the reading is continued in this way, there exist line sensors which read an identical position as observed in the case of, for example, the line sensor L4 at the time T1 and the line sensor L1 at the time T3. By adding the outputs of the line sensors which have read the document in the identical position, the signal-to-noise ratio is able to be improved even when the high-speed reading is executed.

Figure 7:
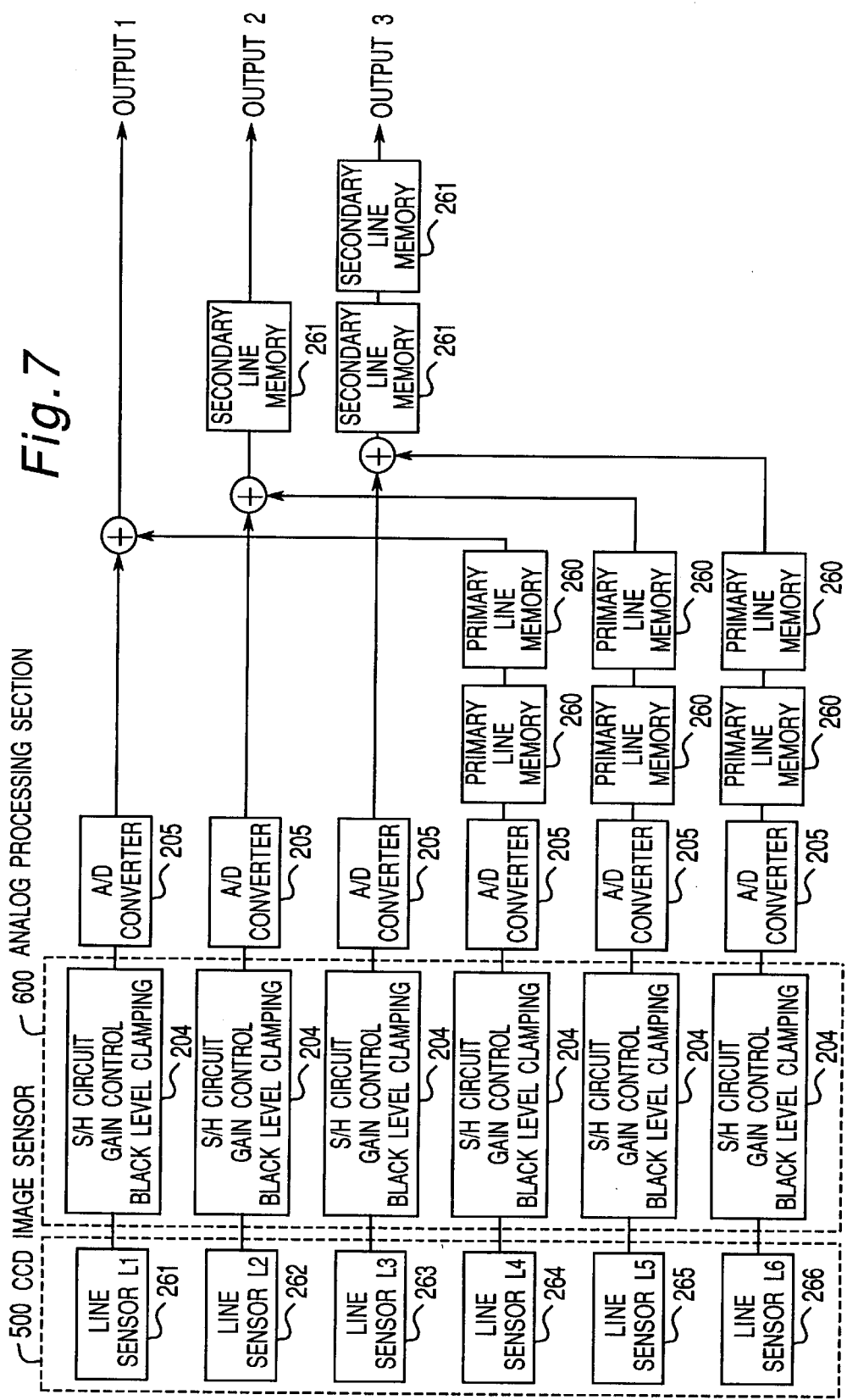
FIG. 7 is a block diagram showing the construction of a signal processing circuit employing six line sensors according to a fourth embodiment of the present invention.

This will be described in more detail with reference to FIG. 7 showing the construction of this fourth embodiment. Outputs from the six line sensors L1 through L6 denoted by 261 through 266 of the fourth embodiment are subjected to various analog signal processings in an analog processing section 600 and thereafter converted into digital signals by six A/D converters 205.

For each of the outputs from the line sensors L4, L5 and L6, primary line memories 260 and 260 for two lines are provided such that the image data read by the line sensors L4, L5 and L6 and the image data read by the line sensors L1, L2 and L3 are synchronized with each other for each identical reading position. The thus synchronized data are added by the summation processing. For example, the image data read by the line sensors L4, L5 and L6 at the time T3 are synchronized with the image data read by the line sensors L1, L2 and L3 at a time T5.

Next, the added data {(image data from the line sensor L2)+(image data from the line sensor L5)} obtained through the summation processing is delayed by one line with the aid of a single secondary line memory 261, and the added data {(image data from the line sensor L3)+(image data from the line sensor L6)} is delayed by two lines with the aid of two secondary line memories 261 and 261. As a result of this operation, read document data of continuous three lines are continuously output in sequence from the outputs 1, 2 and 3 for the image reproduction of the document.

According to this embodiment, the signal-to-noise ratio can be also improved in the reading stage at the speed three times the reference speed.

In the case where the linear CCD sensor is provided with nine line sensors, it is possible to realize an image reading apparatus which, even when the reading is executed at the triple speed, does not impair the signal-to-noise ratio obtainable in the reference speed reading.

(Fifth Embodiment)

A fifth embodiment of the present invention will be described next. The image reading apparatus of this fifth embodiment is provided with a color CCD image sensor having the three line sensors as shown in FIGS. 2, 2A and 4. Each line sensor is provided with a filter having a respective sensitivity for each color R, G and B so that color images are read. In reading a colored document, an output from each line sensor is taken in as image data of each color of R, G and B. In reading a monochrome image, an output from each sensor is taken in as an image data.

Figure 12:
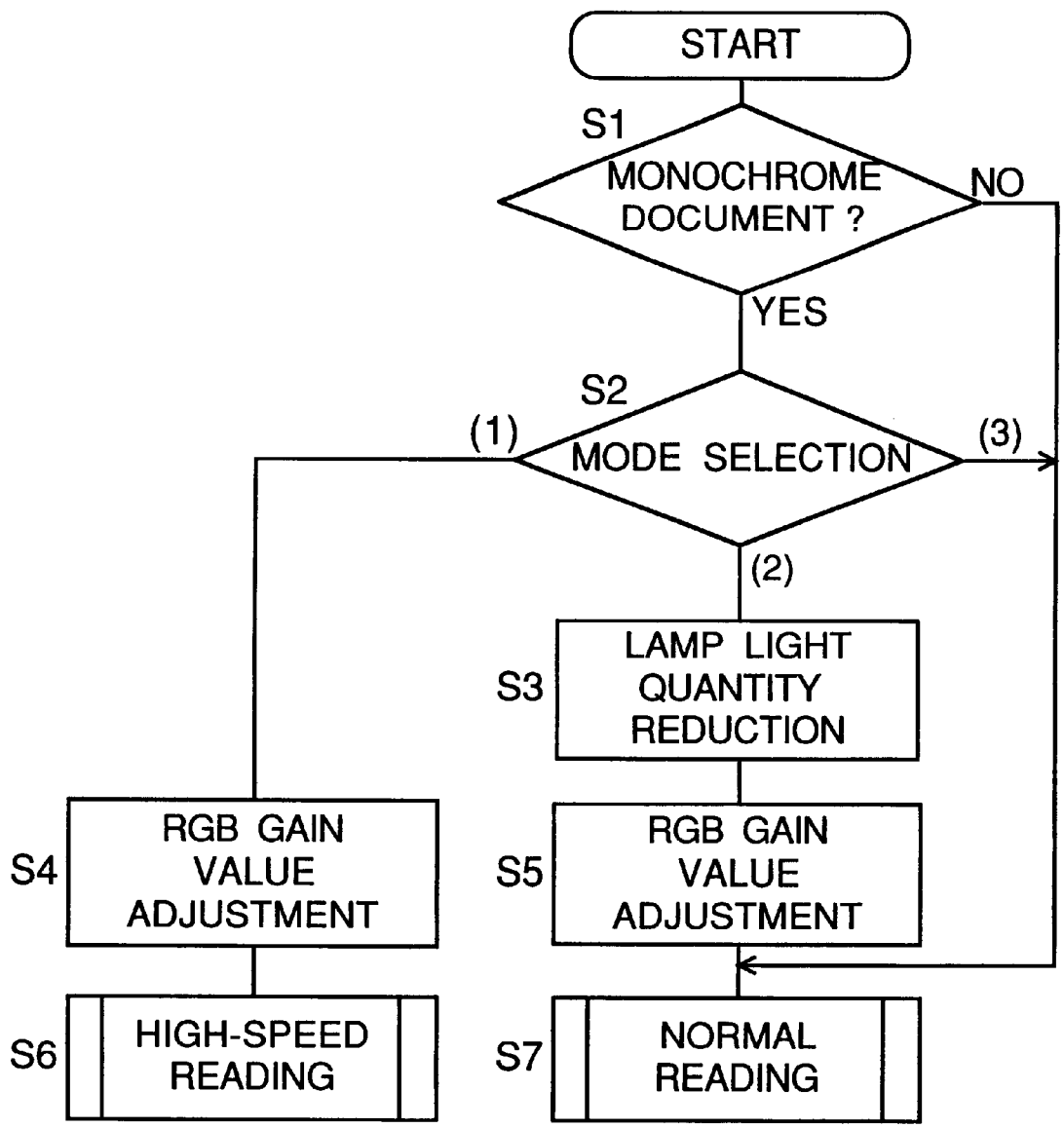
FIG. 12 is a flowchart explaining the contents of control of a color CCD sensor having three line sensors.

The following describes control of the image. reading apparatus of the fifth embodiment which incorporates the color CCD image sensor having the three line sensors, with reference to the flowchart of FIG. 12.

First, it is discriminated in step S1 whether the document is a colored one or a monochrome one. The determination may be made through selection by the user.

Next, in step S2, a reading mode is selected. The reading mode can be selected from among, for example, (1) a high-speed reading mode, (2) an energy saving reading mode and (3) a high image quality reading mode.

When the (1) high-speed reading mode is selected, an RGB gain value is adjusted in step S4. In this case, the adjustment of the gain values of the RGB signals is executed for the elimination of a difference in sensitivity between color filters of the different line sensors. Subsequently, high-speed reading is performed (at the speed three times the reference speed) in step S6.

When the (2) energy saving mode is selected, a lamp light quantity is reset to a half to one third of that in the normal case in step S3. By setting the lamp light quantity to a value lower than in the normal reading stage, power consumption and heat generation are suppressed. Then, sensitivity adjustment of the line sensors is executed in step S5. Then, normal reading is performed at the reference speed in step S7. In this stage, the output values of the line sensors are summed for the compensation of the reduced light quantity.

When the (3) high image quality mode is selected, reading at the reference speed is executed in step S7.

Figure 13:
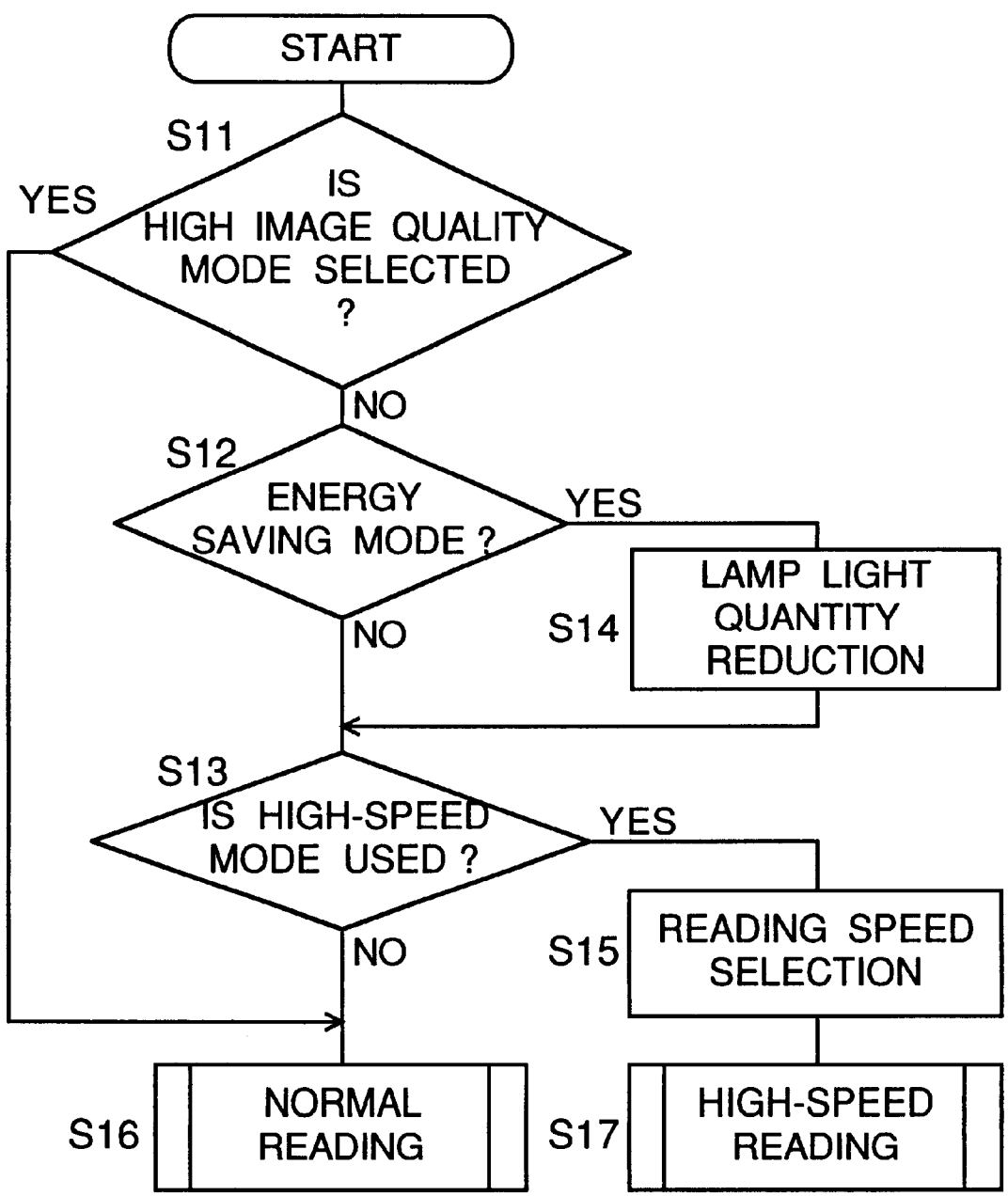
FIG. 13 is a flowchart showing the contents of control when a CCD sensor having a plurality of line sensors is employed.

Next, FIG. 13 shows an example of control of the image reading apparatus which employs a CCD sensor having a plurality of line sensors.

According to this example of control, it is first discriminated in step S11 whether or not the high image quality mode is to be selected. The high image quality mode here refers to a mode to be selected for a document, such as a photograph, which requires a high image quality. When this high image quality mode is selected, the program proceeds to step S16 to perform the reading at the normal reading speed.

When the high image quality mode is not selected in step S11, the program proceeds to step S12. In this step S12, it is discriminated whether or not the energy saving mode is to be selected. The energy saving mode in this case is a mode in which the power consumption is suppressed by reducing the lamp light quantity. When the energy saving mode is selected in step S12, the program proceeds to step S14 to reset the lamp light quantity to reduce it. This reset value depends on the number of lines to be summed.

When the energy saving mode has not been selected in step S12, the program proceeds to step S13 to determine whether to use the high-speed mode. When the high-speed mode has been selected in step S13, the program proceeds to step S15. When the high-speed mode has not been selected, the program proceeds to step S16 to perform the normal reading.

In step S15, selection of the reading speed in the high-speed mode is executed. This reading speed is restricted by the number of the line sensors and the number of the intervening lines between the line sensors of the CCD. Further, the speed is also restricted by the energy saving mode selected previously. Then, the program proceeds to step S17 to execute the reading of the document at the previously set reading speed.

Figure 14:
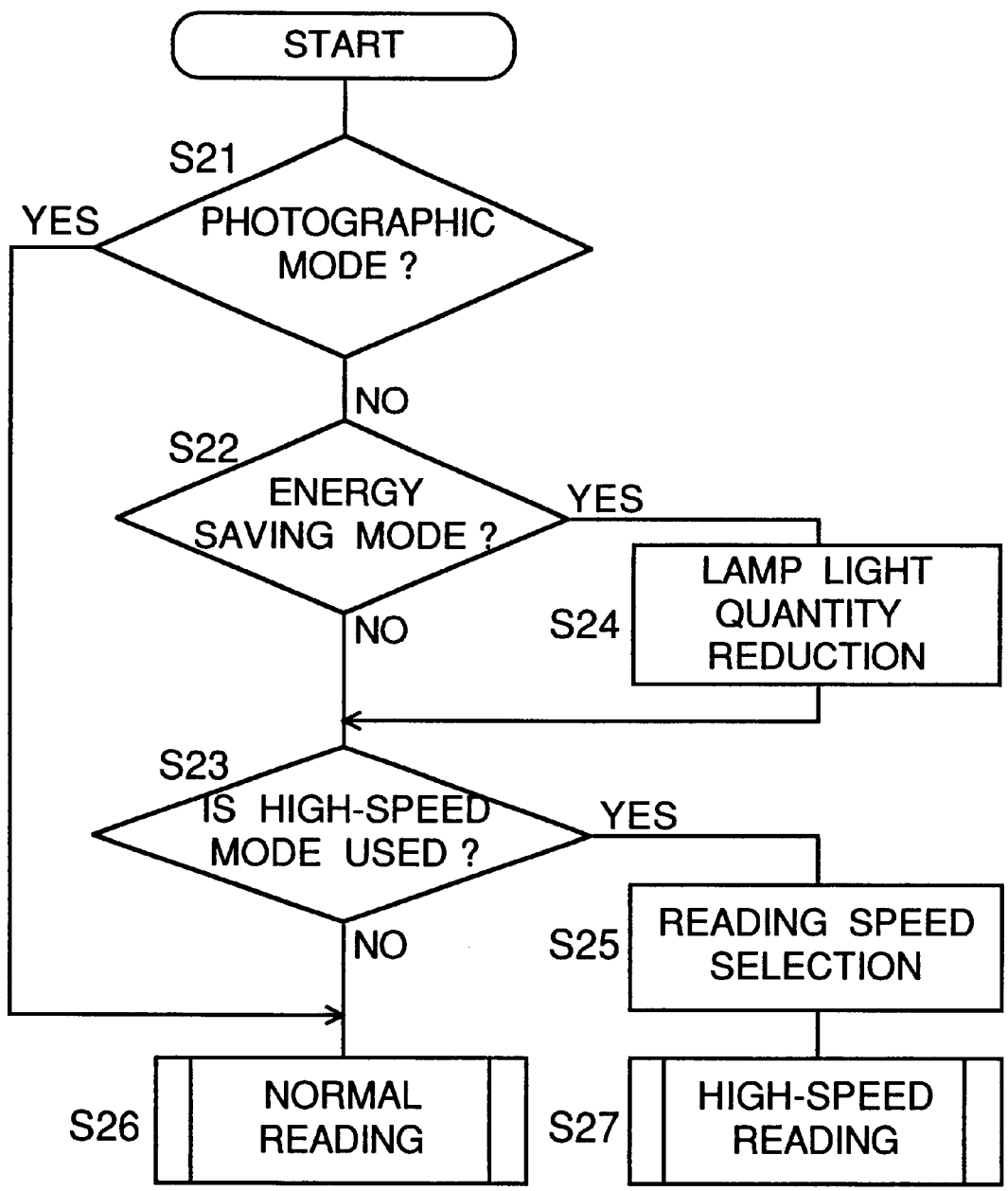
FIG. 14 is a flowchart showing the contents of control of an image reading apparatus having a photographic mode.

Next, an example of the control of the image reading apparatus when it has a photographic mode is described with reference to FIG. 14. The photographic mode here is a mode to be set based on the type of documents. This mode may be set by operating an operator control panel, or alternatively, through an automatic discrimination of the document type after the document reading.

According to this control, when the photographic mode has been selected in step S21, the program proceeds to step S26 to perform the normal reading. Under the photographic mode, no processing is performed in a mode, such as the energy saving mode, the high-speed mode or the like, in which the image quality is lower than in the normal reading. Steps S22 through S27 are the same as those of steps S12 through S17 shown in FIG. 13.

Next, an example of the control of the image reading apparatus when it has an automatic document feeder is described with reference to FIG. 15. The image reading apparatus has a feed and read mode in which images of a document are read while the document is being fed.

Figure 15:
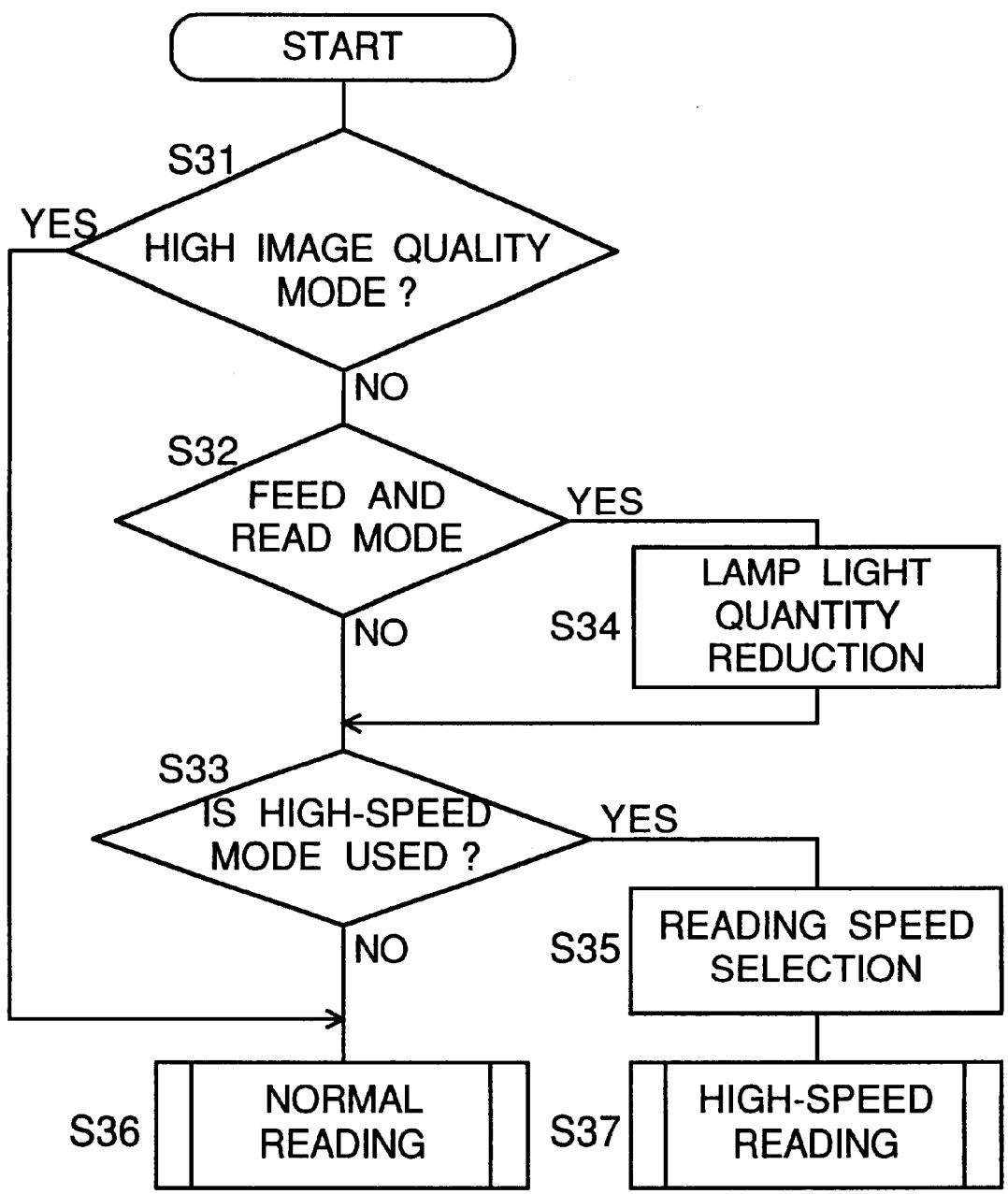
FIG. 15 is a flowchart showing the contents of control of an image reading apparatus incorporating an automatic document feed device.

When the high image quality mode has been selected in step 931 of FIG. 15, the program proceeds to step S36 to execute. the normal reading. When the high image quality mode has not been selected in step S31, the program proceeds to step S32. When the feed and read mode is selected in this step S32, the program proceeds to step S34 in which the lamp light quantity is reduced to be smaller than in the normal reading in an attempt at restricting the heat generation of the lamp. The reduced light quantity is compensated for by performing the reading through summing the output signals of the line sensors.

When the feed and read mode is not selected in step S32, the program proceeds to step S33 to determine whether to use the high-speed mode. Operations subsequent to this step S33 are executed in the same manner as those of the aforementioned steps S15, S16 and S17 of FIG. 13.

As is obvious from the foregoing description of the various embodiments of the present invention, images of the document are read by the plurality of line sensors in a sharing manner. Therefore, a high-speed read operation is be achieved. Furthermore, the analog signal processing section placed in the subsequent stages of the plurality of line sensors shares the analog signal processing of the image data for the images read by the plurality of line sensors. Therefore, the analog signal processing section is not required to have an increased operating speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reading apparatus comprising:
   a plurality of line sensors for simultaneously reading images in different positions of a document and outputting respective image data;
   scanning means for making said plurality of line sensors scan the document;
   reading mode setting means for, when performing image reading with a same resolution, selectively setting a first mode and a second mode, wherein said first mode is a high image quality mode which provides an image quality better than that in the second mode, and said second mode is a high-speed reading mode which provides a reading speed higher than that in the first mode; and
   control means for controlling said scanning means based on the reading mode set by the reading mode setting means,
   wherein said control means controls said scanning means such that:
      in said first mode, said plurality of line sensors scan the document such that an identical part of the document is read a plurality of times, image data obtained by reading the identical part the plurality of times being synthesized when output; and
      in said second mode, said plurality of line sensors scan the document such that each of different parts of the document is read only once, and not a plurality of times.

2. The image reading apparatus as claimed in claim 1, wherein said high image quality mode comprises a function of reducing noises.

3. The image reading apparatus as claimed in claim 1, further comprising:
   document reproduction means for receiving the image data from said plurality of line sensors and outputting the respective image data in controlled sequence corresponding to the positions in which the images represented by said respective image data have been read, to thereby reproduce the images of the document.

4. The image reading apparatus as claimed in claim 1, further comprising:
   illumination means for illuminating the document,
   wherein said reading mode setting means comprises means for setting a third mode in which a light amount of said illumination means is reduced and in which the image data read by the plurality of line sensors are added when output.

5. An image reading apparatus comprising:
   a plurality of line sensors for simultaneously reading images in different positions of a document and outputting respective image data;
   scanning means for making said plurality of line sensors scan the document;
   reading mode setting means for setting an energy saving mode to read the document at a lower energy; and
   operation means for, when said energy saving mode has been set, performing a predetermined operation to the image data output from the plurality of line sensors.

6. The image reading apparatus as claimed in claim 5, further comprising:
   illumination means for illuminating the document,
   wherein, when said energy saving mode has been set, a light amount of said illumination means is reduced, and said operation means adds the image data supplied from the plurality of line sensors when outputting the image data.

7. The image reading apparatus as claimed in claim 6, the reduction of said light amount is controlled in accordance with a number of lines of the image data to be added.

8. The image reading apparatus as claimed in claim 5, further comprising:

document reproduction means for receiving the image data from said plurality of line sensors and outputting the respective image data in controlled sequence corresponding to the positions in which the images represented by said respective image data have been read, to thereby reproduce the images of the document.

9. An image reading apparatus comprising:

image reading means for scanning a document to output image data;

photographic mode setting means for setting a photographic mode in accordance with a type of the document;

discriminating means for discriminating whether said photographic mode has been set or not;

reading mode setting means for selectively setting a normal image quality reading mode and a high image quality reading mode based on discrimination results, wherein the normal image quality reading mode is set when the photographic mode has not been set, and the high image quality reading mode is set when the photographic mode has been set; and control means for controlling said image reading means based on the reading mode set by said reading mode setting means.

10. The image reading apparatus as claimed in claim 9, wherein said high image quality reading mode has a function of reducing noises.

11. The image reading apparatus as claimed in claim 9, wherein said image reading means comprises a plurality of line sensors for simultaneously reading images in different positions of the document and outputting respective image data.

12. The image reading apparatus as claimed in claim 11, further comprising:

document reproduction means for receiving the image data from said plurality of line sensors and outputting the respective image data in controlled sequence corresponding to the positions in which the images represented by said respective image data have been read, to thereby reproduce the images of the document.

13. The image reading apparatus as claimed in claim 9 further comprising, automatically determining whether or not to set the photographic mode based on the type of the document.

14. An image reading method comprising:

selectively setting a first mode and a second mode when performing image reading with a same resolution, wherein said first mode is a high image quality mode which provides an image plurality better than that in the second mode, and said second mode is a high-speed reading mode which provides a reading speed higher than that in the first mode; and simultaneously reading images in different positions of a document to obtain respective image data while scanning the document based on the reading mode selectively set, which, in said first mode, reads an identical part or the document a plurality of times, and synthesizes image data obtained by reading the identical part the plurality of times when outputting the image data, and which, in said second mode, each of different parts of the document is read only once, and not a plurality of times.

15. The image reading method as claimed in claim 14, further comprising:

outputting the respective image data in controlled sequence corresponding to the positions in which the images represented by said respective image data have been read, to thereby reproduce the images of the document.

16. The image reading method as claimed in claim 14, further comprising:

setting a third mode in which a light amount for illumination of the document is reduced and in which the image data read by said plurality of line sensors are added when output.

17. An image reading method comprising:

setting an energy saving mode to read a document at a lower energy;

simultaneously reading images in different positions of the document to obtain respective image data while scanning the document; and performing a predetermined operation to the obtained image data before outputting the image data for reproduction of the images of the document.

18. The image reading method as claimed in claim 17, which, when setting said energy saving mode, reduces a light amount for illumination of the document, and adds the image data obtained by the plurality of line sensors when outputting the image data.

19. The image reading method as claimed in claim 18, which controls the reduction of said light amount in accordance with a number of lines of the image data to be added.

20. The image reading method as claimed in claim 17, further comprising:

outputting the respective image data in controlled sequence corresponding to the positions in which the images represented by said respective image data have been read, to thereby reproduce the images of the document.

* * * * *